United States Patent [19]
Khurana

[11] Patent Number: 5,566,548
[45] Date of Patent: Oct. 22, 1996

[54] EXHAUST MANIFOLD JOINT

[75] Inventor: Greesh Khurana, Lafayette, Ind.

[73] Assignee: Caterpillar Inc., Peoria, Ill.

[21] Appl. No.: 336,436

[22] Filed: Nov. 9, 1994

[51] Int. Cl.[6] .................................................... F01N 7/10
[52] U.S. Cl. .............................................. 60/322; 60/323
[58] Field of Search ....................................... 60/322, 323

[56] References Cited

U.S. PATENT DOCUMENTS

| | | | |
|---|---|---|---|
| 4,205,527 | 6/1980 | Rudert | 60/323 |
| 4,214,444 | 7/1980 | Fujioka | 60/322 |
| 4,658,580 | 4/1987 | Schley | 60/322 |
| 5,311,738 | 5/1994 | Huster | 60/322 |

*Primary Examiner*—Douglas Hart
*Attorney, Agent, or Firm*—Dennis C. Skarvan

[57] ABSTRACT

An exhaust manifold joint includes a number of like exhaust manifold segments mounted to a corresponding number of cylinder heads of a large diesel engine. The exhaust manifold segments slip relative one another to accommodate thermal growth differentials between the exhaust manifold segments and the cylinder head. The exhaust manifold segments are further mounted to the cylinder head via fasteners that extend through a bolt hole of the exhaust. manifold. The bolt hole incorporates a reverse counterbore at the manifold to cylinder head attachment to move loading of the fastener away from the attachment, thereby resulting in elastic deformation rather than yielding of the fastener during loading of the fastener.

15 Claims, 4 Drawing Sheets

Fig_1_
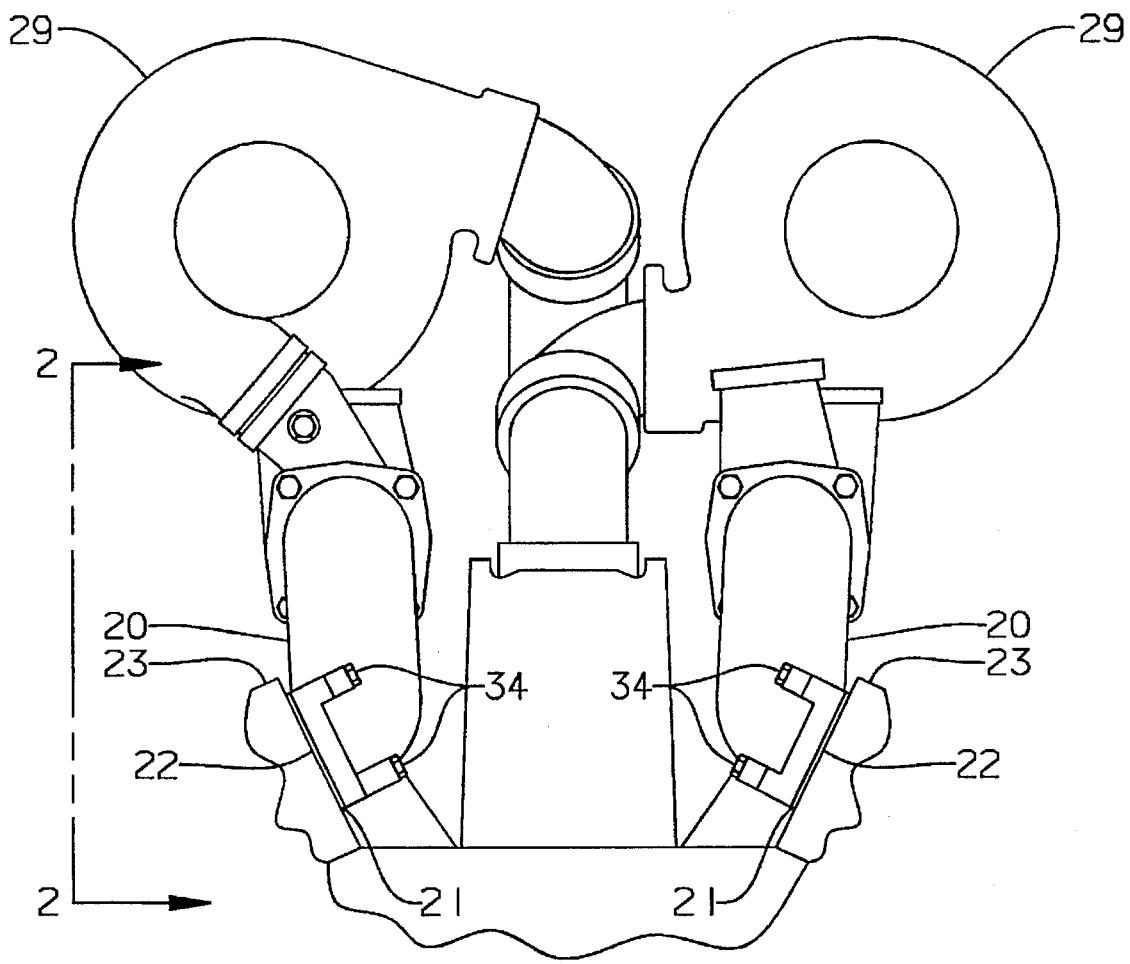
Fig_2_
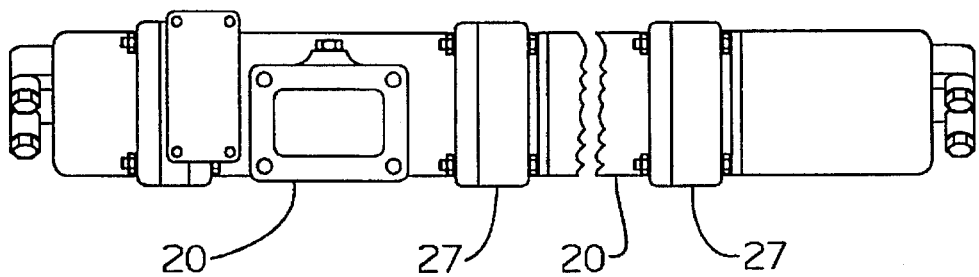

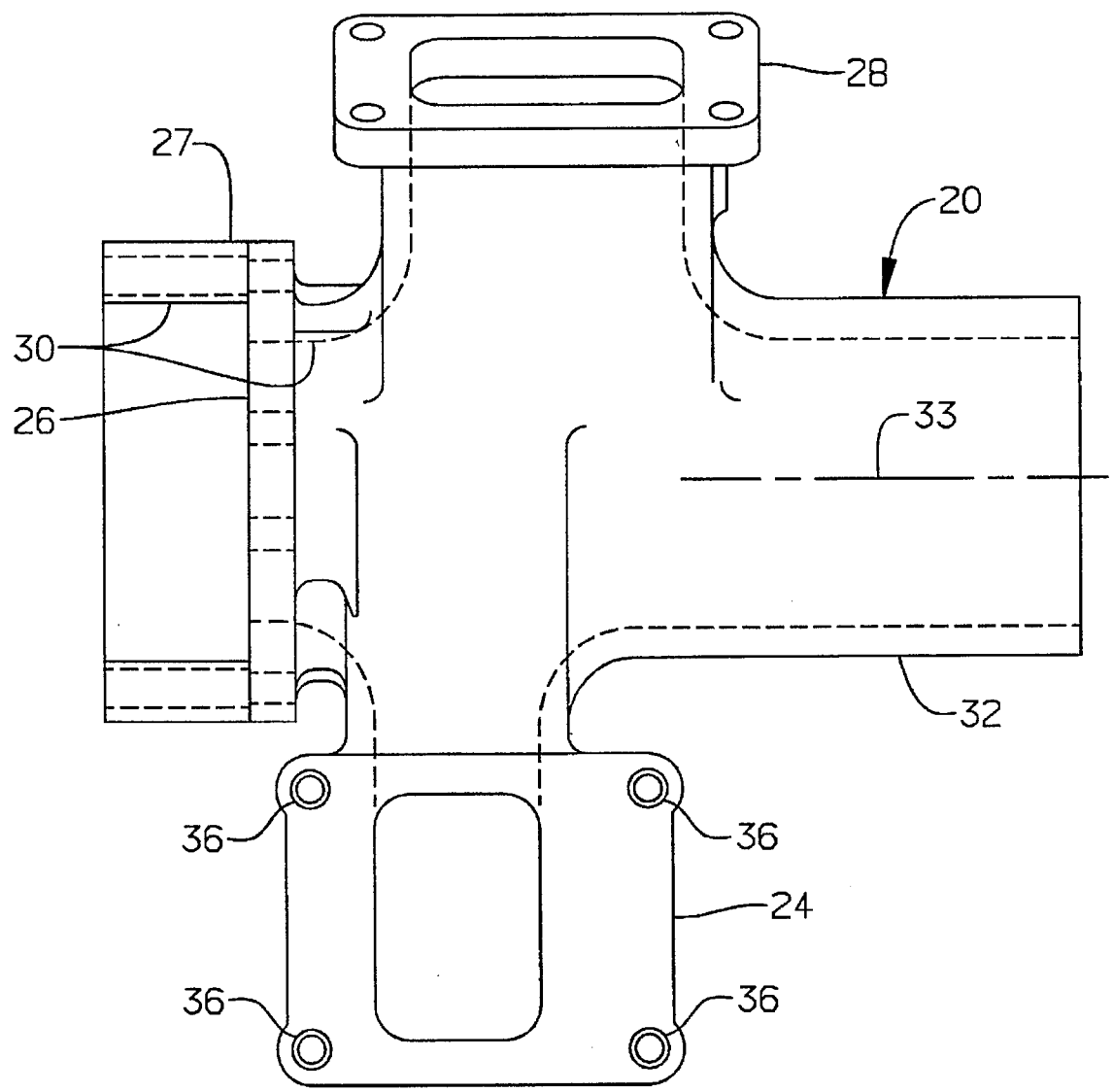
Fig_4

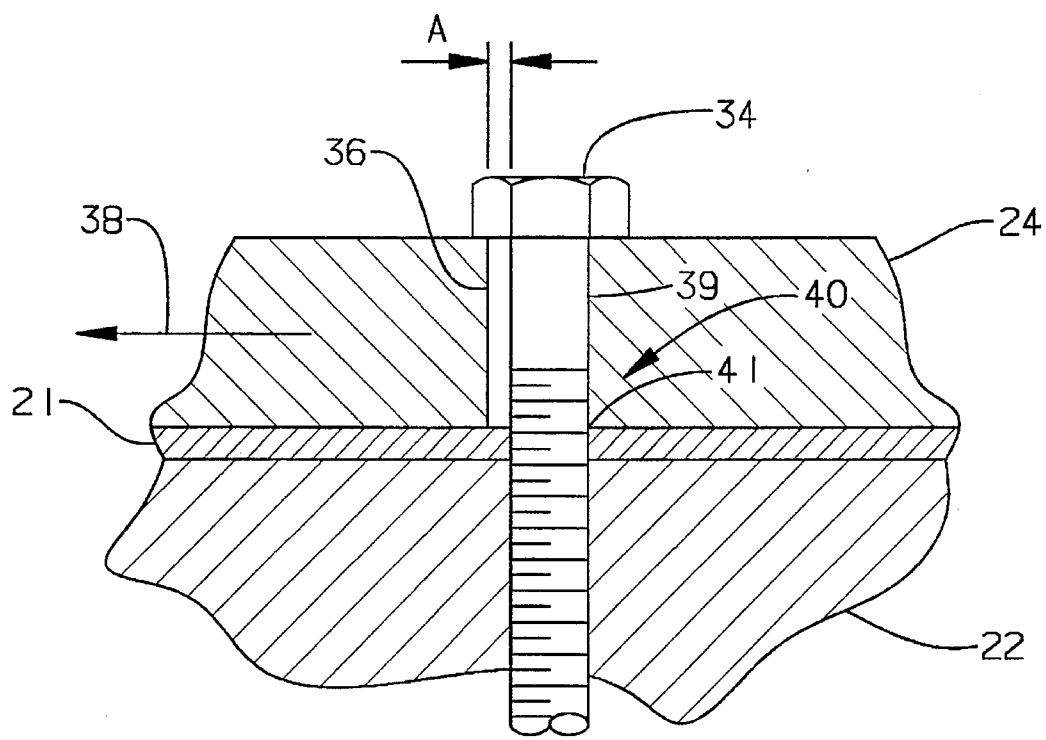
Fig_5_
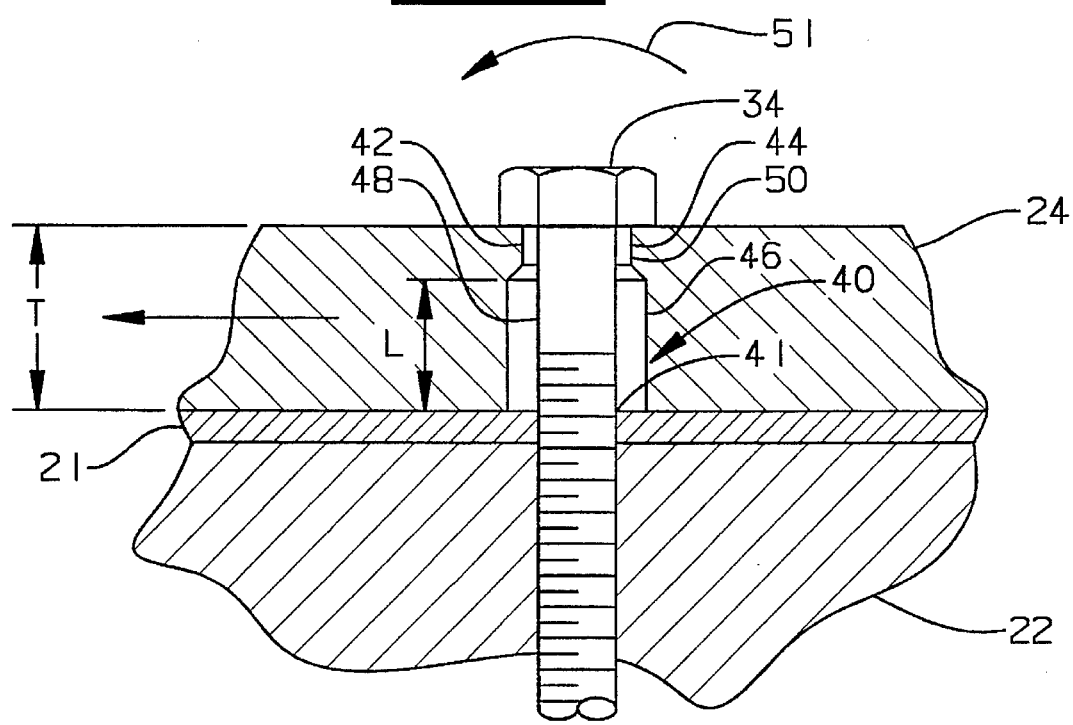
Fig_6_

5,566,548

1

EXHAUST MANIFOLD JOINT

TECHNICAL FIELD

The present invention relates generally to an exhaust manifold joint for use with an internal combustion engine and, more particularly, to an exhaust manifold attachment that accommodates relative lateral movement between the exhaust manifold and cylinder head of the engine.

BACKGROUND ART

In large diesel engines, a number of exhaust manifold segments attach to the cylinder heads of the engine. The exhaust manifold segments interconnect with one another to define an exhaust manifold assembly through which exhaust gasses are communicated. In such large engines, the manifold segments move relative to one another during engine operation due to thermal growth differentials between the manifold segments themselves and due to thermal growth differentials between the manifold segments and cylinder heads.

Typically, the exhaust manifold segments are bolted to the individual cylinder heads and, therefore, any thermal growth differential is accommodated between the individual manifold segments. Should the individual manifold segments seize, however, any further thermal differential growth accumulates along the length of the seized manifold segments and results in excessive loading at the manifold to cylinder head attachment. Ultimately, excessive loading at the manifold to cylinder head attachment can lead to yielding of the attachment bolt or other fastener and break the seal at the manifold to cylinder head attachment. The resulting leakage of exhaust gasses causes loss of engine performance.

The present invention is directed to providing an exhaust manifold assembly in which the exhaust manifold to cylinder head joint accommodates relative movement between the exhaust manifold and cylinder head to prevent leakage of exhaust gasses at the joint.

DISCLOSURE OF THE INVENTION

According to one embodiment of the present invention, a manifold assembly for use with an internal combustion engine is disclosed, the manifold assembly including a head of an internal combustion engine, an exhaust manifold having a flange adapted for mounting to the head, the flange including a mounting surface and a bolt hole extending from the mounting surface, the bolt hole including a reverse counterbore adjacent to the mounting surface, and a fastener received through the bolt hole and threadably engaged with the head.

According to another embodiment of the present invention, a manifold assembly for use with an internal combustion engine is disclosed, the manifold assembly including a head of an internal combustion engine, a first exhaust manifold having a first flange adapted for mounting to the head, a second exhaust manifold having a second flange adapted for mounting to the head, the first exhaust manifold and the second exhaust manifold being slidably connected relative one another to communicate exhaust gasses therebetween, the first flange and the second flange each including a mounting surface and a bolt hole extending from the mounting surface, the bolt hole including a first cylindrical portion opposite the mounting surface and a second larger diameter cylindrical portion adjacent to the mounting surface, and a fastener received through the bolt hole and threadably engaged with the head, wherein the second cylindrical portion defines a predetermined diametral clearance with the fastener adjacent to the head when the first cylindrical portion contacts the fastener during lateral movement of the first flange and the second flange relative to the head.

BRIEF DESCRIPTION OF THE DRAWINGS

FIG. 1 is a front elevational view of an engine having exhaust manifolds mounted thereto according to one embodiment of the present invention.

FIG. 2 is a side elevational view of interconnected exhaust manifold segments of FIG. 1 taken along line 2—2 in the direction indicated by the arrows.

FIG. 4 is a bottom plan view of the exhaust manifold segment of FIG. 3.

FIG. 5 is a cross-sectional view of a prior art exhaust manifold mounting arrangement.

FIG. 6 is a cross-sectional view of the exhaust manifold mounting arrangement of FIG. 3 taken along line 3—3 in the direction indicated by the arrows.

BEST MODE FOR CARRYING OUT THE INVENTION

Figure 3:
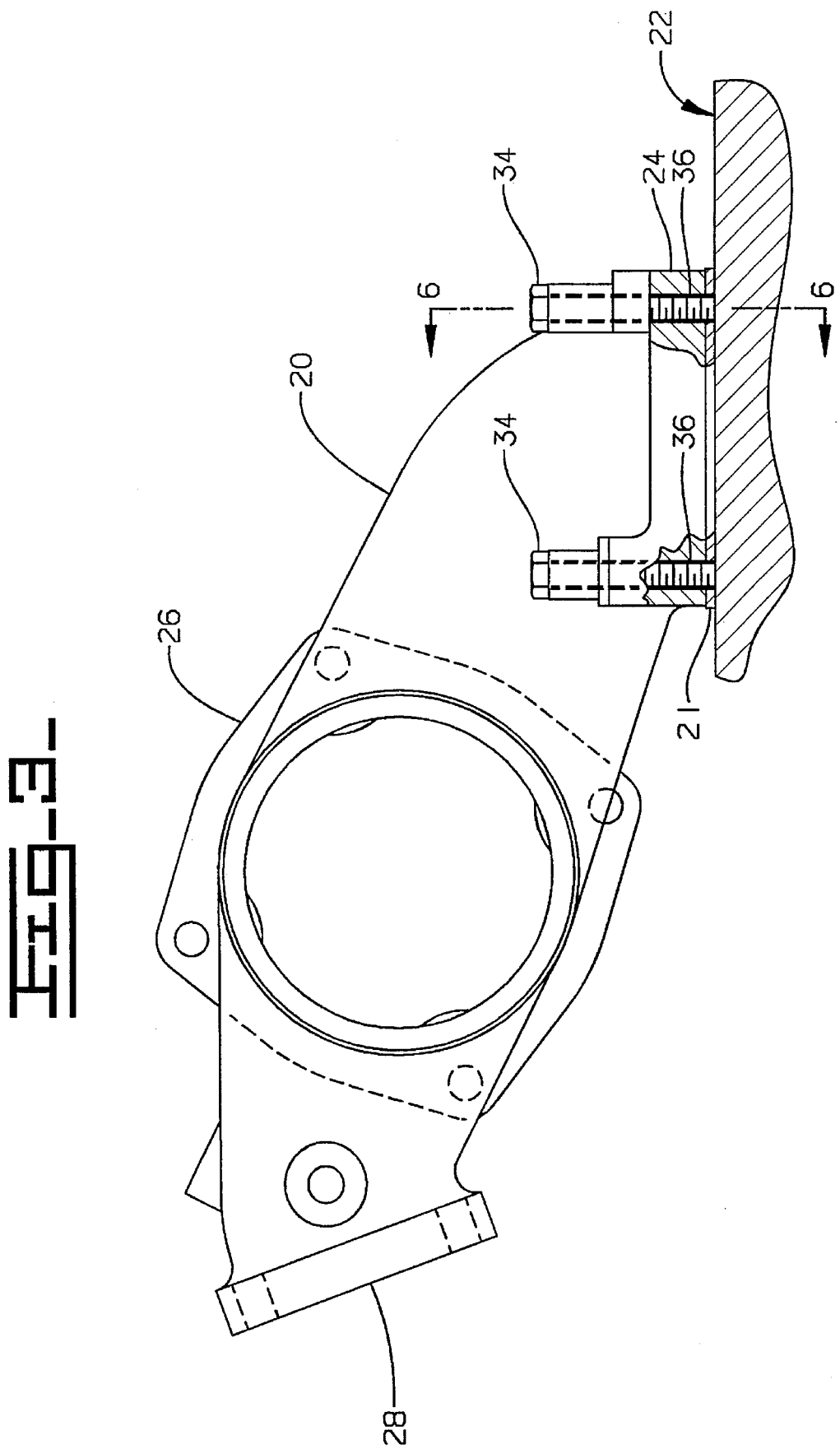
FIG. 3 is a side elevational view of an individual exhaust manifold segment.

Referring now to FIGS. 1 and 3, an exhaust manifold 20 is shown mounted to a gasket 21 and head 22 of an internal combustion engine 23. Although the present invention benefits any engine having an exhaust manifold mounted to a head, in the preferred embodiment the internal combustion engine is a large multi-cylinder engine having a number of like exhaust manifolds 20 interconnected with one another (FIG. 2). For example, in an industrial diesel engine of V-type configuration and having sixteen cylinders, a corresponding sixteen exhaust manifolds are mounted to the portion of the head adjacent each cylinder and are interconnected as described hereinafter in greater detail.

Exhaust manifold 20 includes flanges 24, 26 and 28 adapted for interconnecting manifold 20 with various exhaust components of the internal combustion engine. For example, flange 24 is adapted for mounting manifold 20 to head 22, flange 26 is adapted for interconnecting manifold 20 with other like manifolds 20 via sleeves 27, and flange 28 is adapted for receiving an exhaust driven device mounted thereon such as turbocharger 29 as shown here.

Referring now to FIGS. 2 and 4, because manifold 20 interconnects with other like manifolds, sleeve 27 includes a cylindrical bore 30 adapted for slidably receiving a cylindrical extension 32 of another like manifold 20. As such, a slip joint is defined between the extension 32 and bore 30 which permits the individual manifolds 20 to grow relative to one another due to differences in thermal expansion between the manifolds 20 or due to differences in thermal expansion between head 22 and manifolds 20. To minimize leakage of exhaust gasses between interconnecting manifolds, the radial clearance between the outer diameter of extension 32 and the inner diameter of bore 30 is relatively small, on the order of 0.010 inches nominal radial clearance for a 5.0 inch diameter extension/bore.

In some instances, debris such as exhaust soot accumulates between extension 32 and bore 30 and, because of the high exhaust temperatures, solidifies to interfere with the relative motion between like manifolds 20. Similarly, assembly stack and warpage between manifolds 20 can interfere with the relative motion between like manifolds 20. Regardless of the cause, if manifolds 20 are not free to slide relative one another (i.e., the relative axial movement between extension 32 and bore 30 along axis 33), any mismatch in thermal expansion results in high shear loads being applied at the mounting of flange 24 to head 22. The present invention is directed to accommodating high shear loads at the exhaust manifold to cylinder head attachment.

Referring back to FIGS. 1 and 3, threaded fasteners 34 attach flange 24 to head 22 at four peripheral bolt hole locations indicated at 36 (FIG. 4). Prior art mounting arrangements such as those shown in FIG. 5 provide a sufficient diametral clearance between bolt hole 36 and fastener 34 to accommodate any thermal growth resulting between manifolds 20. For example, as indicated by the direction of arrow 38, if flange 24 grows leftward relative to head 22, the diametral clearance "A" is taken up before any loads are applied to fastener 34. Upon the diametral clearance "A" being taken up (as shown in FIG. 5), flange 24 begins to apply lateral loading along shank 39 of fastener 34. As further loading is applied along shank 39, the edge 41 of flange 24 begins to cut into fastener 34 resulting in a stress concentration or notch factor at the point of contact. As a result of load multiplication due to the stress concentration factor, yielding of fastener 34 occurs at generally the interface of flange 24 with head 22 as indicated at 40.

To prevent loading of the fastener in the prior art mounting arrangement of FIG. 5, the diametral clearance "A" is increased to accommodate the worse case thermal growth differential between manifolds 20 and head 22. However, as the diametral clearance "A" is increased, positive location of the manifold 20 relative to the head 22 is reduced, thus further increasing the tendency for the manifolds 20 to bind rather than slip relative one another.

The present invention overcomes the problems of this and other prior art manifold mounting arrangements by altering the loading of fastener 34. Referring now to FIG. 6, flange 24 is shown mounted to head 22 by fasteners 34. Unlike the prior art mounting arrangements having cylindrical bolt holes or uniform clearance bores 36 as represented by FIG. 5, the present invention provides a stepped clearance bore 42.

In particular, bore 42 includes a first cylindrical portion 44 opposite or remote from interface 40 and a second, larger diameter, cylindrical portion 46 adjacent to interface 40. First cylindrical portion 44 has a diameter approximately 0.010 inches larger than the diameter of the shank 39 of fastener 34, yielding a diametral clearance of 0.010 inches. As a result, flange 24 accommodates 0.010 inches of thermal growth differential between manifold 20 and head 22 without any loading of fastener 34. Upon the 0.010 inches of clearance being taken up, flange 24 begins to apply loading at the distal end 48 of shank 39. Because the second cylindrical portion 46 has a greater diameter than the first cylindrical portion 44, edge 41 remains out of contact with fastener 34 as loading is applied to fastener 34. Instead, edge 50 contacts shank 39 of fastener 34. However, before edge 50 can cut into shank 39, the bending moment (indicated at 51) of the loading applied at end 48 causes fastener 34 to elastically deflect to reduce the loaded contact with edge 50.

In keeping with the present invention, second cylindrical portion 46 ranges from a simple reverse counter bore immediately adjacent to interface 40 and opposite the head of the end of fastener 34 to a bore having a length "L" greater than 50 percent of the thickness "T" of flange 24. In the specific preferred embodiment shown, length "L" of second cylindrical portion 46 is approximately 75 percent of the thickness "T" of flange 24. The further the point of loaded contact is moved away from interface 40, the greater the tendency is for fastener 34 to elastically deflect rather than yield.

Another benefit of the present invention is the improved location of the manifolds 20 relative to the cylinder heads 22. As previously discussed in connection with FIG. 5, the ability to positively locate the exhaust manifold relative to the cylinder head is a function of the diametral clearance "A" required to accommodate thermal growth differential between the exhaust manifold and cylinder head. The present invention reduces the diametral clearance "A" necessary to accommodate relative movement between the exhaust manifold and cylinder head by permitting fastener 34 to elastically accommodate some relative movement. As a result of the lower diametral clearance, a more positive location is provided for the exhaust manifold to the cylinder head.

I claim:

1. A manifold assembly for use with an internal combustion engine, comprising:

a head of an internal combustion engine;

a first exhaust manifold having a first flange adapted for mounting to said head;

a second exhaust manifold having a second flange adapted for mounting to said head;

said first exhaust manifold and said second exhaust manifold being slidably connected relative one another to communicate exhaust gasses therebetween;

said first flange and said second flange each including a mounting surface and a bolt hole extending from said mounting surface, said bolt hole including a first cylindrical portion opposite said mounting surface and a second larger diameter cylindrical portion adjacent to said mounting surface; and a fastener received through said bolt hole and threadably engaged with said head;

wherein said second cylindrical portion defines a predetermined diametral clearance with said fastener adjacent to said head when said first cylindrical portion contacts said fastener during lateral movement of said first flange and said second flange relative to said head.

2. The manifold assembly of claim 1, wherein:

said fastener includes a shank portion received in said bolt hole; and said first cylindrical portion is sized for receiving said shank portion at a predetermined small diametral clearance therewith.

3. The manifold assembly of claim 2, wherein said predetermined small diametral clearance is less than 10 percent of the diameter of said shank portion.

4. The manifold assembly of claim 1, wherein said first and second flanges each have a thickness and said second cylindrical portion has a length greater than 50 percent of said thickness.

5. The manifold assembly of claim 4, wherein said second cylindrical portion has a length greater than 75 percent of said thickness.

6. In an exhaust manifold assembly for use with an internal combustion engine, the assembly including a number of exhaust manifolds interconnected with one another to communicate exhaust gasses therebetween, each of said exhaust manifolds including a flange having a mounting surface, a bolt hole extending within said flange from said mounting surface, and a fastener extending from the engine and received through said bolt hole for mounting said exhaust manifold to the engine, the improvement comprising said bolt hole having a reverse counterbore adjacent to said mounting surface.

7. The improvement of claim 6, wherein:

said fastener includes a shank portion received in said bolt hole; and said bolt hole is sized for receiving said shank portion at a predetermined small diametral clearance therewith.

8. The improvement of claim 7, wherein said predetermined small diametral clearance is less than 10 percent of the diameter of said shank portion.

9. The improvement of claim 6, wherein said flange has a thickness and said second reverse counterbore has a length greater than 50 percent of said thickness.

10. The improvement of claim 9, wherein said reverse counterbore has a length greater than 75 percent of said thickness.

11. A manifold for use with an internal combustion engine, comprising:

a head of an internal combustion engine;

an exhaust manifold having a flange adapted for mounting to said head;

said flange including a mounting surface and a bolt hole extending within said flange from said mounting surface, said bolt hole including a reverse counterbore adjacent to said mounting surface; and a fastener received through said bolt hole and threadably engaged with said head.

12. The manifold of claim 11, wherein:

said fastener includes a shank portion received in said bolt hole; and said reverse counterbore is sized for receiving said shank portion at a predetermined small diametral clearance therewith.

13. The manifold assembly of claim 12, wherein said predetermined small diametral clearance is less than 10 percent of the diameter of said shank portion.

14. The manifold assembly of claim 11, wherein said flange has a thickness and said reverse counterbore has a length greater than 50 percent of said thickness.

15. The manifold assembly of claim 14, wherein said reverse counterbore has a length greater than 75 percent of said thickness.

* * * * *